(12) United States Patent
Schmidt

(10) Patent No.: US 9,193,040 B2
(45) Date of Patent: Nov. 24, 2015

(54) MACHINE VISE ATTACHMENT

(75) Inventor: David L. Schmidt, Zimmerman, MN (US)

(73) Assignee: Kurt Manufacturing Company, Inc., Minneapolis, MN (US)

( * ) Notice: Subject to any disclaimer, the term of this patent is extended or adjusted under 35 U.S.C. 154(b) by 96 days.

(21) Appl. No.: 13/591,299

(22) Filed: Aug. 22, 2012

(65) Prior Publication Data

US 2014/0054835 A1    Feb. 27, 2014

(51) Int. Cl.
| | | |
|---|---|---|
| *B23Q 3/02* | (2006.01) | |
| *B25B 1/24* | (2006.01) | |
| *B25B 1/10* | (2006.01) | |
| *B23Q 39/02* | (2006.01) | |

(52) U.S. Cl.
CPC .............. *B25B 1/2405* (2013.01); *B25B 1/103* (2013.01); *B25B 1/2468* (2013.01); *B25B 1/2473* (2013.01); *B25B 1/2484* (2013.01); *B25B 1/2489* (2013.01); *B23Q 39/02* (2013.01)

(58) Field of Classification Search
USPC .......................................................... 269/95
See application file for complete search history.

(56) References Cited

U.S. PATENT DOCUMENTS

| | | | | |
|---|---|---|---|---|
| 81,764 A | * | 9/1868 | Fisher | 269/283 |
| 266,523 A | * | 10/1882 | Read | 269/192 |
| 957,520 A | * | 5/1910 | Stearns | 269/285 |
| 979,305 A | * | 12/1910 | Hunt | 269/9 |
| 1,125,395 A | * | 1/1915 | Recconi | 269/82 |
| 1,404,109 A | * | 1/1922 | Fulton | 29/560.1 |
| 1,406,981 A | | 2/1922 | Cramer | |
| 1,423,774 A | * | 7/1922 | Moore | 269/73 |
| 1,730,510 A | | 10/1929 | Jensen | |
| 1,748,886 A | * | 2/1930 | Linares | 269/55 |
| 1,772,899 A | * | 8/1930 | Johnson | 72/322 |
| 1,811,299 A | | 6/1931 | Brockhaus, Jr. | |
| 1,971,069 A | | 8/1934 | Heinrich | |

(Continued)

FOREIGN PATENT DOCUMENTS

| | | |
|---|---|---|
| DE | 1728292 B | 10/1970 |
| DE | 102006046863 A1 | 4/2008 |

(Continued)

OTHER PUBLICATIONS

5 Axis Vise Advertisement, Vischer & Bolli, AG, Dubendorf Switzerland, 2 pgs.

(Continued)

*Primary Examiner* — Lee D Wilson
*Assistant Examiner* — Alvin Grant
(74) *Attorney, Agent, or Firm* — Steven M. Koehler; Westman, Champlin & Koehler, P.A.

(57) ABSTRACT

A main machine vise has a second auxiliary vise having independently movable clamping jaws attached to it with the auxiliary vise set to one side of the main machine vise and above a supporting surface of a machine tool table on which the main machine vise is mounted. The auxiliary vise has a movable jaw that moves in a plane generally perpendicular to the tool table on which it is mounted, while the main machine vise has a movable jaw that moves in a plane parallel to the tool table or surface on which it is mounted. The auxiliary vise is mounted on a bracket that offsets the clamping jaws of the auxiliary vise from the main machine vise so that work pieces can be independently clamped in each of the vises. The auxiliary vise includes a vibration reducing stabilizer for attaching to the tool table or support.

21 Claims, 8 Drawing Sheets

(56) References Cited

U.S. PATENT DOCUMENTS

| | | | |
|---|---|---|---|
| 2,176,608 A | 10/1939 | Marsilius | |
| 2,274,428 A | 2/1942 | Odin | |
| 2,411,059 A * | 11/1946 | Rubenstein | 269/136 |
| 2,552,094 A | 5/1951 | Hamon et al. | |
| 2,564,138 A | 8/1951 | Walker | |
| 2,570,857 A | 10/1951 | Purpura | |
| 2,680,395 A | 6/1954 | Christiansen | |
| 2,699,708 A | 1/1955 | Fotsch | |
| 2,771,803 A * | 11/1956 | Staples et al. | 269/224 |
| 2,976,776 A * | 3/1961 | Ramsey | 269/156 |
| 3,397,880 A | 8/1968 | Kuban | |
| 3,502,319 A * | 3/1970 | Kazolias | 269/280 |
| 3,685,817 A * | 8/1972 | Worthington | 269/139 |
| 4,043,547 A | 8/1977 | Glomb et al. | |
| 4,098,500 A | 7/1978 | Lenz | |
| 4,141,542 A * | 2/1979 | Wolff | 269/88 |
| 4,192,521 A | 3/1980 | Smith | |
| 4,449,704 A * | 5/1984 | Goulter | 269/88 |
| 4,529,183 A | 7/1985 | Krason et al. | |
| 4,583,724 A | 4/1986 | Huang | |
| 4,685,663 A | 8/1987 | Jorgensen | |
| 4,736,934 A | 4/1988 | Grech | |
| 4,898,371 A | 2/1990 | Mills et al. | |
| 4,958,818 A | 9/1990 | Buchter | |
| 4,969,637 A | 11/1990 | Nishimura | |
| 5,121,908 A | 6/1992 | Shatkus et al. | |
| 5,197,721 A | 3/1993 | Ruberg | |
| 5,242,159 A | 9/1993 | Bernstein | |
| 5,405,124 A * | 4/1995 | Mayer et al. | 269/45 |
| 5,415,383 A * | 5/1995 | Ausilio | 269/238 |
| 5,497,980 A | 3/1996 | Chick | |
| 5,497,982 A | 3/1996 | Stoltz et al. | |
| 5,582,397 A | 12/1996 | Lavin | |
| 5,975,513 A | 11/1999 | Wolfe | |
| 5,996,986 A | 12/1999 | Ewing | |
| 6,164,635 A | 12/2000 | Chase et al. | |
| 6,338,477 B1 * | 1/2002 | Moore | 269/60 |
| 6,364,302 B2 * | 4/2002 | Ausilio | 269/32 |
| 6,406,012 B1 * | 6/2002 | Guo | 269/212 |
| 6,428,251 B1 * | 8/2002 | Steven | 409/131 |
| 6,889,968 B1 * | 5/2005 | Wong | 269/91 |
| 6,896,249 B1 | 5/2005 | Ferrara | |
| 7,055,813 B2 | 6/2006 | Hexamer, Jr. | |
| 7,114,714 B2 * | 10/2006 | Wong | 269/45 |
| 7,134,650 B2 | 11/2006 | Trudel et al. | |
| 7,163,201 B2 | 1/2007 | Bernstein | |
| 7,380,777 B1 * | 6/2008 | Walser | 269/71 |
| 7,934,711 B2 * | 5/2011 | Wong | 269/45 |
| 8,256,753 B2 | 9/2012 | Teo | |
| 8,292,279 B2 | 10/2012 | Zhang | |
| 8,382,081 B2 | 2/2013 | Van de Vosse et al. | |
| 8,646,765 B2 | 2/2014 | Caldarone | |
| 8,678,363 B2 | 3/2014 | Baker | |
| 2007/0241250 A1 * | 10/2007 | Wong | 248/226.11 |
| 2008/0203637 A1 | 8/2008 | Li et al. | |
| 2009/0072462 A1 * | 3/2009 | Wong | 269/45 |
| 2010/0164158 A1 | 7/2010 | Weissenborn | |
| 2010/0164159 A1 | 7/2010 | Wurthele | |
| 2012/0043711 A1 | 2/2012 | Schmidt | |
| 2012/0169000 A1 * | 7/2012 | Lin et al. | 269/216 |
| 2014/0103593 A1 | 4/2014 | Lin et al. | |

FOREIGN PATENT DOCUMENTS

| | | | | |
|---|---|---|---|---|
| DE | 102006050247 A1 * | 4/2008 | | B25B 1/24 |
| EP | 1787756 A2 | 5/2007 | | |
| GB | 1357115 A * | 6/1974 | | |
| JP | 2008264983 A | 11/2008 | | |

OTHER PUBLICATIONS

5 Axis Machine Tool Vise Gressel AG, Aadorf, Switzerland, 2 pgs.

* cited by examiner

MACHINE VISE ATTACHMENT

BACKGROUND OF THE DISCLOSURE

The present invention relates to an auxiliary machine vise attachment which transforms a machine vise into a duplex or double vise capable of holding two work pieces with a movable clamping jaw on a first or main machine vise moving in a plane generally horizontal to a machine tool table supporting the vises, and the auxiliary vise having a movable clamping jaw moving in a plane perpendicular to the machine tool table. The movable jaw of the auxiliary vise slides on guideways which are positioned relative to a cylindrical bore which precisely guides the moveable jaw of the auxiliary vise as the work piece is clamped.

In many instances, it is desirable to hold elongated work pieces in a vertical position for machining on ends and the like, and it is difficult to do with ordinary machine vises mounted on a machine tool table. The main orientation for mounting machine vises is with a width dimension of the jaws and the plane for support of the work piece extending parallel to the machine tool table. The moveable jaw of the main machine vise also moves in a plane that is generally horizontal and parallel to the table top. An attachment for a shaper vise that provides auxiliary jaws is shown in U.S. Pat. No. 1,971,069, but this unit is mounted directly onto the end of a vise, making it difficult to load and also difficult to have parts clamped in the jaws of each of the sets of jaws at the same time.

SUMMARY OF THE INVENTION

The present invention relates to an attachment for a machine vise that comprises an auxiliary vise having independent vise clamping jaws, oriented to have the width of the vise jaws and the work piece support plane generally perpendicular to a machine tool table or other support surface on which the vises are mounted. The auxiliary vise thus has a movable jaw that moves in a plane which is perpendicular to the tool table or other support on which the main machine vise is mounted, while the main machine vise has a movable jaw that moves in a plane parallel to the tool table or support surface on which it is mounted.

The auxiliary vise is mounted on a bracket that offsets the clamping jaws of the auxiliary vise from the main machine vise so that work pieces can be independently clamped in each of the vises, and used for machining a work piece held in one set of jaws without interfering with the work piece held in the other set of jaws. The auxiliary vise includes a stabilizer for attaching to the tool table or support to rigidly hold the auxiliary vise in position so vibrations are greatly reduced. The auxiliary vise provides an adequate securing force for elongated work pieces that extend vertically alongside the tool table on which the vises are mounted.

The mounting bracket for the auxiliary vise is designed to have a standard mounting system such that the mounting bracket is readily mounted to any industry standard machine vise.

The positioning of the auxiliary vise is elevated from the machine tool table on which the vises are mounted to provide a vise jaw location that is more conducive to holding elongated work pieces, and provides clearance for machining. Even with the auxiliary vise mounted on the main machine vise, there is no interference with the set up or changing of jaw plates on the main machine vise, and the auxiliary vise likewise can be operated separately. The auxiliary vise is positioned laterally of the main machine vise so that it does not impede the machining area of the main machine vise such that the duplex vise assembly set up enhances machining capabilities, and does not impede machining in most applications.

The jaws of the main machine vise and of the auxiliary vise are separated sufficiently, and in the line of operator view so that the operator can easily see the work pieces that are being clamped and machined in either or both vises, and the operator can easily load and unload such work pieces.

DETAILED DESCRIPTION OF PREFERRED EMBODIMENTS

Figure 1:
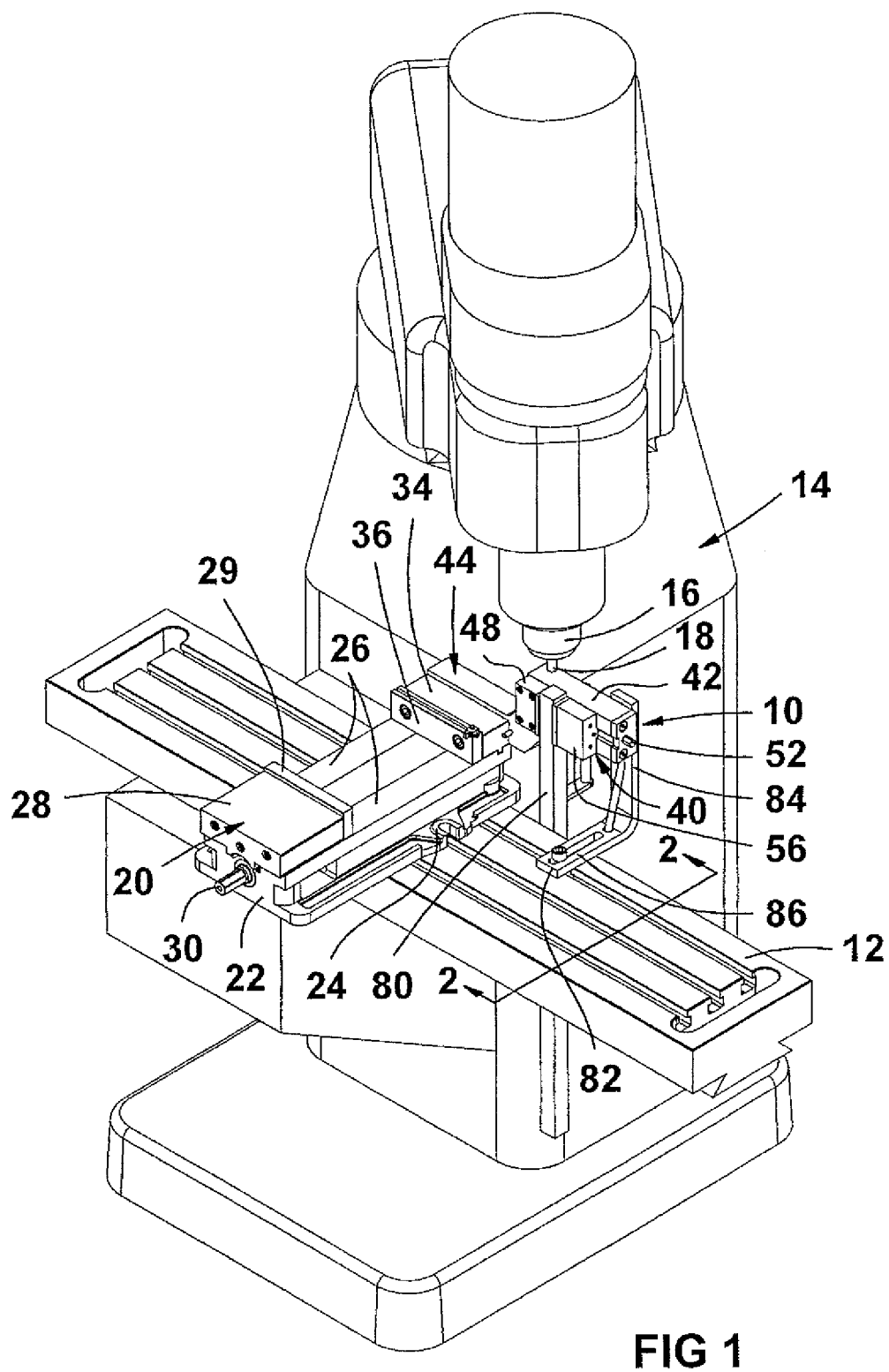
FIG. 1 is a perspective view of an auxiliary machine vise attachment mounted onto a main machine vise to form a duplex vise, shown in position on a typical machine tool.

In FIG. 1, a duplex vise assembly indicated generally at 10 is shown installed on a machine tool table 12 of a machine tool 14. The machine tool 14 has a rotatably driven spindle 16 and a rotating tool 18 that is used for machining work pieces. The duplex vise assembly includes a main machine vise 20 of conventional design that includes the vise body 22 having flanges 24 that are secured to the tool table 12 in a conventional manner with T-shaped hold down bolts. The vise body 22 is supported and held securely on the tool table so that the guide surfaces or guideways 26 for guiding a movable jaw 28 of the main machine vise form a plane parallel to the upper surface of the tool table 12. The movable jaw 28 has a changeable jaw plate 29 thereon, and is driven utilizing a vise screw 30, driving a vise jaw nut 32 (FIG. 3) in a conventional manner to move the movable vise jaw 28 toward and away from a fixed jaw 34, which includes a changeable jaw plate 36. The main machine vise 20 is an industry standard machine vise, and operates in a manner that is well known in the art, and for example it can be a machine vise sold by Kurt Manufacturing Company, Inc. of Coon Rapids, Minn. An operator can stand at the machine tool near the end of the vise screw 30 shown in FIG. 1, and use a crank to rotate the vise screw and move the moveable vise jaw 28.

The vise jaw nut 32 of the main machine vise is shown as typical of conventional guidance arrangements of existing vise jaw nuts. The guideways 26 of the main machine vise have overhanging shoulders 27, that have downwardly facing surfaces to support upwardly facing surfaces of ears 33 on each side of the jaw nut 32. The jaw nut travels along the body of the main machine vise supported in a chamber 35 in the vise by the side surfaces 27A of the overhanging shoulders and the mating surfaces on the underside of the shoulders and the upper surface of the ears 33, as well as the screw 30. The jaw nut 32 is made to provide downward force on the movable jaw when clamping the movable jaw. This downward force tends to lift the jaw nut, which lifting force is resisted by the ears 33 and the underside of the guideway shoulders 27.

Figure 3:
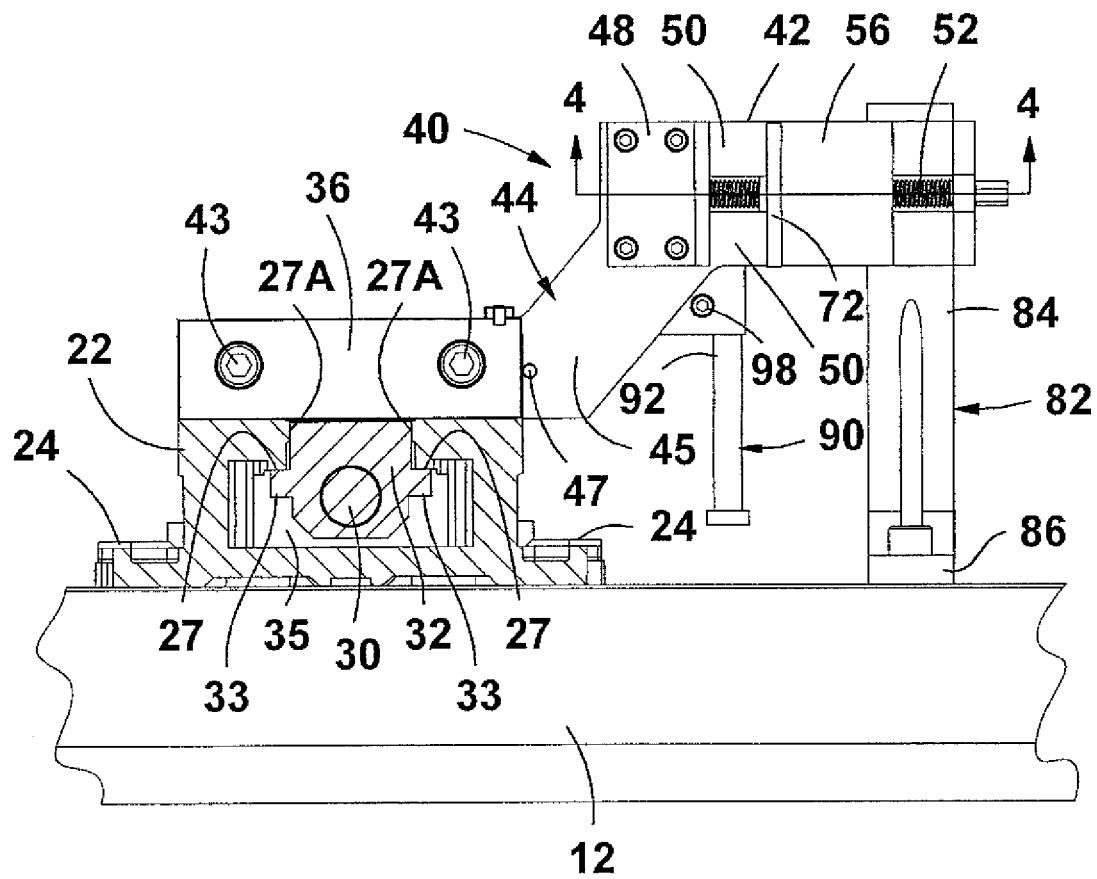
FIG. 3 is sectional view taken along line 3-3 in FIG. 2.

An auxiliary vise 40 is mounted onto and becomes integral with the main machine vise 20. The auxiliary vise 40 has a vise base 42, that includes an integral (as shown) bracket 44 provided with a support portion 44A having a planar support surface 44B that mates with and seats against a planar machined surface on the rear of the fixed jaw 34 of the main machine vice. The support portion 44A has bores through which cap screws 46 extend from the planar surface 44B and which thread into threaded openings in the fixed jaw 34. The openings for cap screws 46 are spaced apart a standard spacing for cap screws used for attaching jaw plates to the fixed jaw of a machine vise, such as cap screws 43 holding the jaw plate 36 onto the fixed jaw 34, as shown in FIG. 3. The cap screws 46 are threaded into the existing threaded holes of the fixed jaw on the main machine vise and tightened down to hold the bracket 44 onto the fixed jaw 34 of the main machine vise precisely positioned relative to the fixed jaw 34 clamping surface. The secured bracket 44 then will securely and precisely hold the auxiliary vise body 42 mounted on the main machine vise to form the duplex vise assembly 10.

Figure 2:
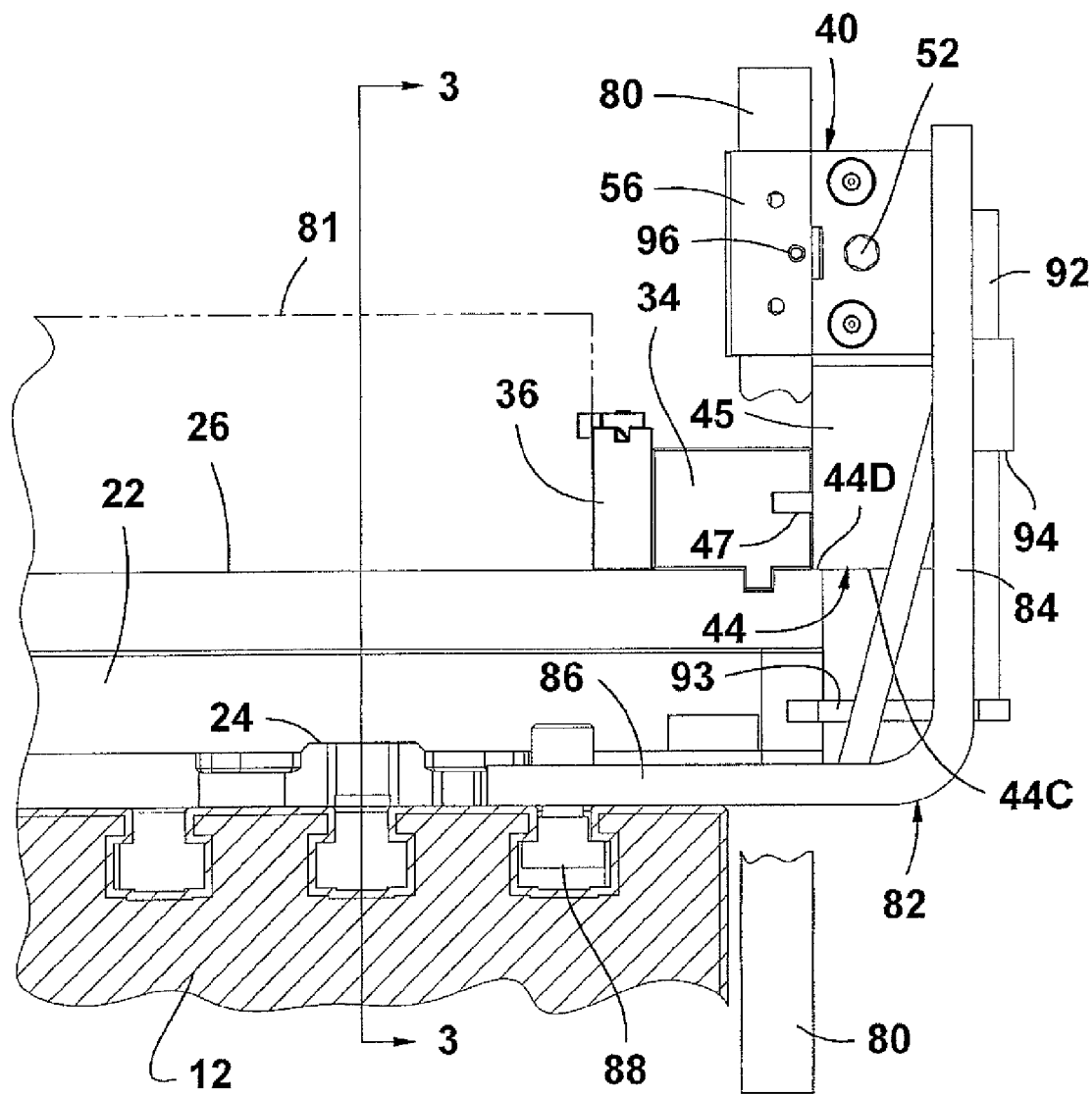
FIG. 2 is a sectional view taken along line 2-2 in FIG. 1.

A guide dowel pin 47 is provided for location of the bracket 44 and the auxiliary vise body relative to the machined side surface of the fixed jaw 34. Three dimensional location of the auxiliary vise body 42 is achieved by resting the machined bottom surface 44C of the bracket 44 on an end portion of the guideways 26 of the main machine vise that extend out beyond the rear side of fixed jaw 34, as shown in FIG. 2 at 44D.

The bracket 44 and auxiliary vise body 42 are shown as one unitary piece, but the bracket 44 can be a separate piece that is bolted or otherwise secured to the auxiliary vise body, if desired.

Body 42 of the auxiliary vise has a fixed auxiliary vise jaw 48 supported on suitable jaw guide surfaces or guideways 50. An auxiliary vise screw 52 is rotatably mounted on the body 42, and is used for moving a moveable auxiliary vise jaw 56 along the guideways 50. The auxiliary vise screw 52 is rotatably mounted on the vise body 42 of the auxiliary vise, and has an enlarged end 51 that is rotatably mounted in a counter bore 53 at the end of the auxiliary vise below the fixed jaw 48 and which reacts tension loads in the vise screw 52 through thrust bearings and a wall 76 formed in the auxiliary vise body.

The three dimensional locating surfaces on the main machine vise 20 are the machined guide surfaces or guideways 26, and the side and rear surfaces of the fixed jaw 34, which is precisely positioned on the guideways 26. The mating surfaces 44B and 44C on bracket 44, and the dowel pin 47 are precisely located relative to the auxiliary vise jaws and guide surfaces.

Figure 5:
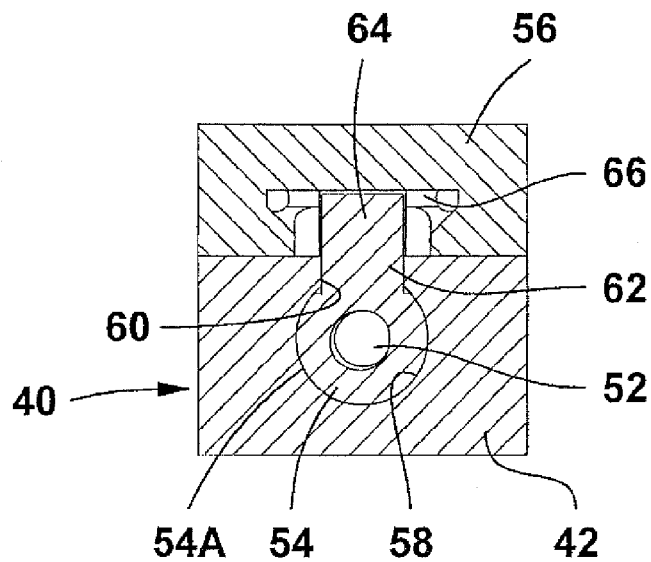
FIG. 5 is a sectional view taken as on line 5-5 in FIG. 4.

The auxiliary vise screw is threaded in a bore of a moveable auxiliary vise jaw nut 54. The moveable auxiliary vise jaw nut 54 has a part cylindrical outer surface 54A, as shown in FIG. 5, and the part cylindrical surface 54A fits closely in a bore 58 formed in the vise body 42 of the auxiliary vise. The bore 58 is cylindrical except that it is intersected by a slot shown at 60 through which a neck 62 of the auxiliary vise jaw nut 54 extends. The surface 58 is thus also part cylindrical. The neck 62 is connected to an auxiliary vise jaw nut head 64 that extends up into a recess 66 in the movable auxiliary vise jaw 56.

The vise jaw nut head 64 is configured to form a downwardly facing drive surface 68 at a driving end of the auxiliary vise jaw nut 54, that engages an upwardly facing surface 70 formed on the forward side of the recess 66 in the moveable auxiliary vise jaw 56. The surface 68 provides a downward force on the moveable auxiliary vise jaw as it engages and drives surface 70, urging the moveable auxiliary vise jaw toward the guide surfaces or guideways 50. A changeable jaw plate 72 can be mounted on the moveable auxiliary vise jaw 56, and a changeable jaw plate 74 can be mounted on the fixed jaw 48 of the auxiliary vise. A set screw 96 is used for keeping the surfaces 68 and 70 in contact during use. The jaw plates can also mount on the back sides of the movable and stationary jaws. Moving the jaw plates to the outside allows holding or encompassing larger parts.

Figure 4:
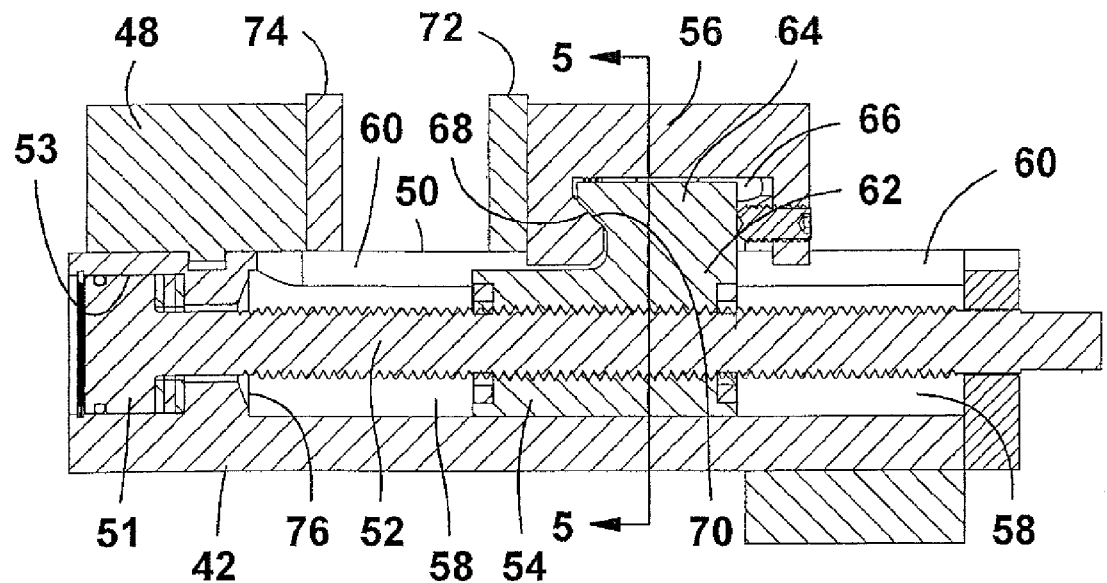
FIG. 4 is a sectional view taken as on line 4-4 in FIG. 3.

The part cylindrical surface 58 in the vise body 42 of the auxiliary vise extends along the entire length of the auxiliary vise body to the end wall 76, which provides a load wall against which the enlarged end 51 of the auxiliary vise screw 52 reacts forces when a work piece is clamped in the auxiliary vise. The surface 58 provides a cylindrical guide surface for the auxiliary vise jaw nut 54 along the entire length of the travel of the auxiliary vise jaw nut 54 from the closed position of the jaw plates 72 and 74 to an open position. FIG. 4 shows the auxiliary vise jaws partially open. The auxiliary vise screw 52 can be driven with a suitable crank. The positioning of the auxiliary vise permits an operator standing at the tool tale 12 to turn both the main machine and auxiliary vise screws easily. Mounting the auxiliary vise elevated from the main machine vise and raised above the level of the tool table or other support, and with the jaw opening of the auxiliary vise facing toward the operator position, makes the jaw openings of both the main machine and auxiliary vises easily reached and observed.

The part cylindrical bore 58 in the auxiliary vise body 42 and the part cylindrical outer surface 54A of the auxiliary vise jaw nut 54 cooperate with close tolerances to adequately guide the auxiliary vise jaw nut, and prevent extra play making the jaw drive for the movable auxiliary vise jaw very precise. The outer surface 54A of the auxiliary vise jaw nut is part cylindrical for all of the outer surface except for the neck 62, as shown, preferably about 300 degrees around the axis of the vise screw. The bore 58 cylindrical surface extends around the bore the same amount.

The movable jaw 56 of the auxiliary vise has a surface on the bottom side that slides on the guide surfaces or guideways 50, which form a plane that supports the moveable auxiliary vise jaw 56. The plane of the guideways 50 is the plane of movement of the movable jaw 56 of the auxiliary vise 40, and the plane of the guideways 26 of the main machine vise 20 forms a plane of movement of the movable jaw 28 of the main machine vise 20. For convenience in orienting the auxiliary vise when attached to a supporting surface, the planar support surface 44B of the support section 44A of the bracket 44 is parallel to the plane of movement of the movable auxiliary vise jaw 56.

The vise jaws of both vises 20 and 40, and the jaw plates thereon have a width that extends across the guide surfaces that support them, and a height of the jaw plates is in a direction perpendicular to the plane of the guide surfaces, or perpendicular the plane of the movement of the movable jaws. As can be seen in FIGS. 1 and 2, the plane of the guideways 26 of the main machine vise 20 is parallel to the upper surface of the tool table 12, which generally is horizontal, and the plane of the guideways 50 of the auxiliary vise is perpendicular to the plane of the table 12, or generally vertical. In other words, the support plane for work pieces held by the main machine vise and the auxiliary vise are perpendicular to each other.

As shown in FIG. 1, an elongated work piece 80 is positioned between the fixed and movable jaws of the auxiliary vise, and is clamped in place where the end of the work piece 80 can be machined with the machine tool 18. The mounting bracket 44 is shaped, and the main machine vise is positioned on the tool table, such that the support plane for the work piece 80 formed by the guideways 50 of the auxiliary vise is offset from the side of the tool table 12, and the elongated work piece 80 can extend down below the tool table.

Additionally, a work piece clamped against the fixed jaw plate 36 of the fixed jaw 34 of the main machine vise is positioned inwardly over the surface of the tool table 12, so the work piece held by the main machine vise 20 is offset from a work piece 80 that is being held in the auxiliary vise.

Figure 6:
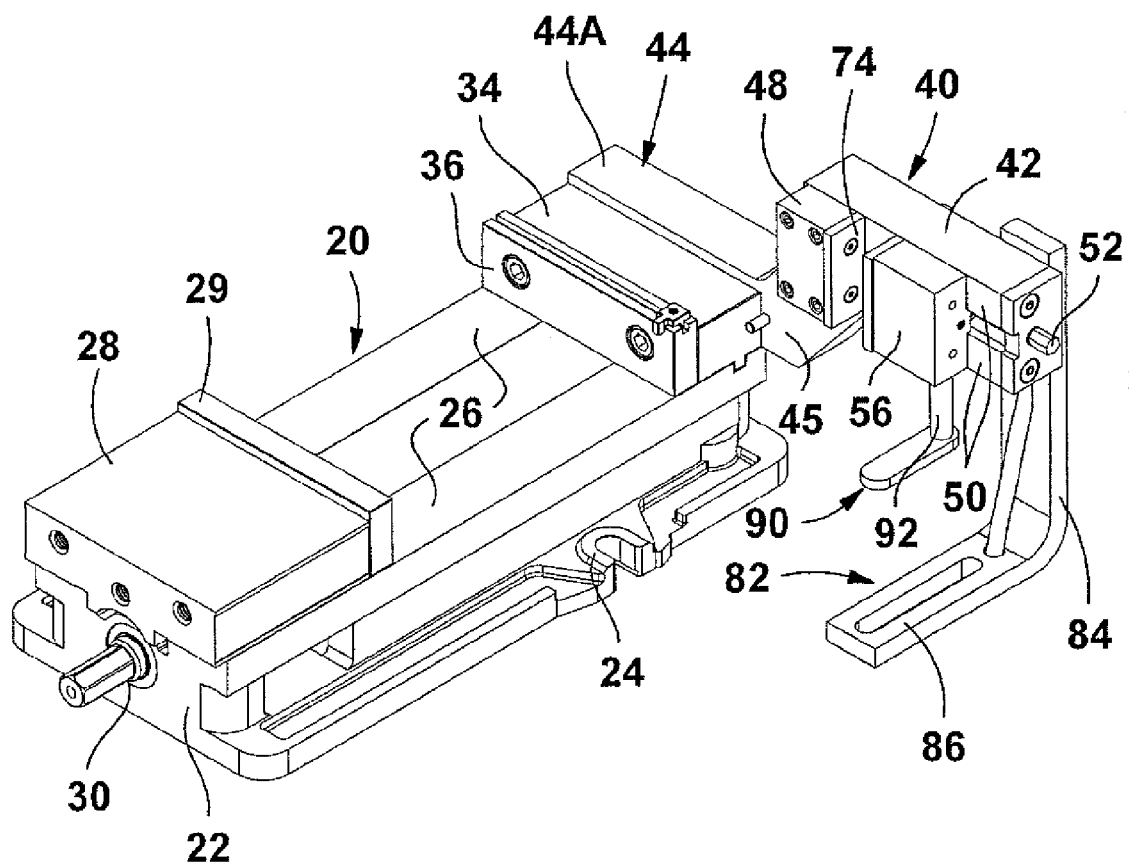
FIG. 6 is a perspective view of a duplex vise of the present disclosure removed from a tool table.

Bracket 44, as shown in FIG. 6 has an angular offset arm section 45 that raises the body 42 of the auxiliary vise 40 upwardly above the plane of the tool table 12, and upwardly above the plane of the guideways 26 of the main machine vise, so that the clamping region of the auxiliary vise between the auxiliary vise jaws is spaced upwardly from any support surface of the main machine vise to provide clearance for a work piece clamped in the main machine vise. This means that an elongated work piece 80 can be clamped in the auxiliary vise, and another work piece shown in dotted lines at 81 (FIG. 2) can be clamped in position on the main machine vise at the same time, without one interfering with the other.

The auxiliary vise 40 is stabilized with a stabilizer bracket 82 that has an upright column part 84 that is bolted securely to the vise body 42 of the auxiliary vise, and a support foot portion 86 at right angles to the upright portion 84 as shown in FIG. 2. The support foot portion 86 can be securely bolted to the tool table 12 or other support with a T-nut 88, as shown in FIG. 2, to avoid vibration caused by machining of the elongated work piece 80. The auxiliary vise jaws are offset from the main machine vise, and raised from the tool table 12 for clearance and to enhance the ability of an operator to observe machining of work pieces in both the main machine vise and the auxiliary vise.

Figure 7:
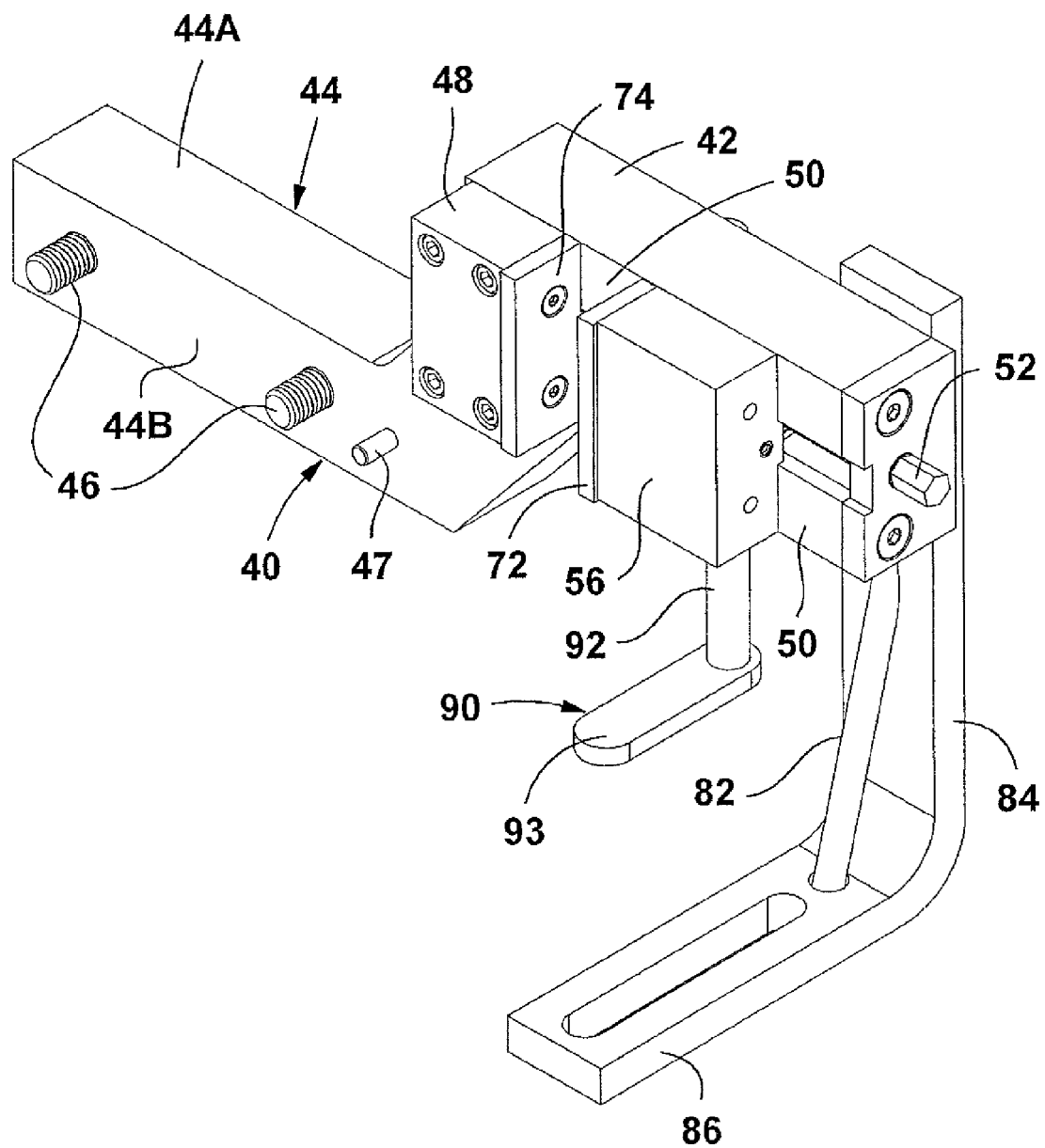
FIG. 7 is a front perspective view of the auxiliary vise removed from its mounting on the main machine vise.
Figure 8:
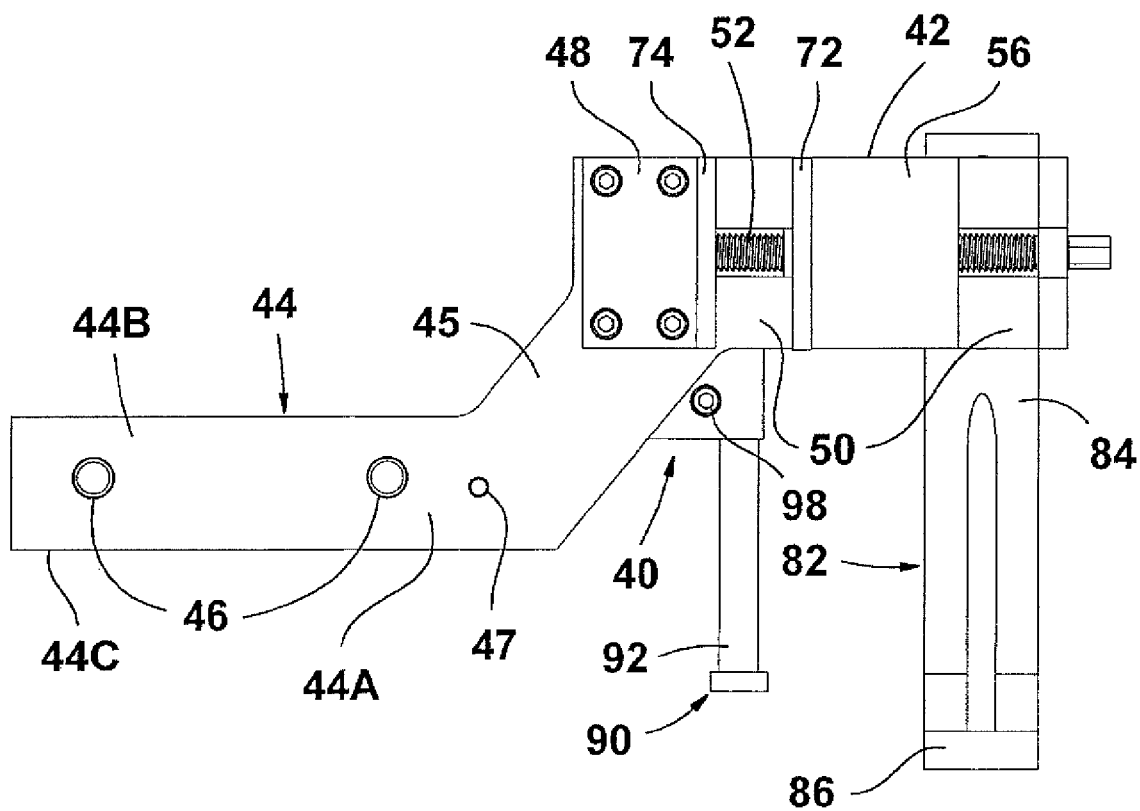
FIG. 8 is a front view of the auxiliary vise of FIG. 7.
Figure 9:
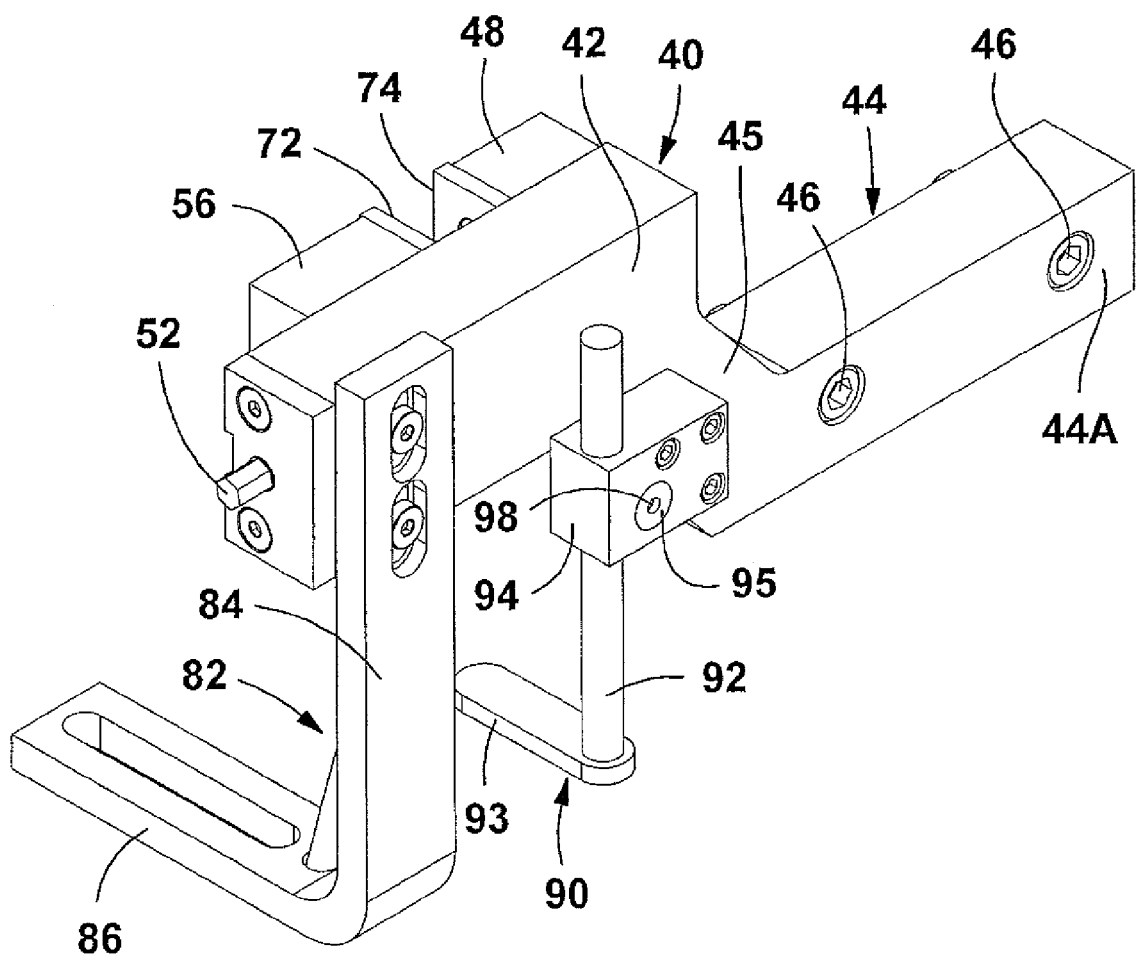
FIG. 9 is a rear perspective view of the auxiliary vise of FIG. 7.

Additionally, a locator assembly 90 can be provided on the auxiliary vise and moved vertically for positioning work pieces that are held in the auxiliary vise. The assembly 90 has a support foot 93 mounted on a shaft 92 (FIG. 7) that slides in a bore in a block 94 (FIGS. 2 and 9) supported by the bracket 44. A movable lock plug 95 is slidable in a bore to move against the shaft 92 by threading a cap screw 98, for locking the support foot in place for supporting a work piece during repetitive machining. The locator 90 can be inverted so the locator foot is above the auxiliary vise for locating the top end of a work piece held in the auxiliary vise.

It should also be noted that the slot 60 that is machined to intersect the cylindrical bore 58 and for receiving the neck 62 is precisely machined, and the sides of the neck 62 and the head 64 of the auxiliary vise jaw nut also can be quite precisely machined so that the sliding movement of the auxiliary vise jaw nut along the sides of the surfaces of the slot 60 provides very precise positioning and control of the head 64.

Although the present invention has been described with reference to preferred embodiments, workers skilled in the art will recognize that changes may be made in form and detail without departing from the spirit and scope of the invention.

What is claimed is:

1. An attachment for a machine vise having a machine vise body securable to a support, a fixed machine vise jaw on the body and a movable machine vise jaw movable toward and away from the fixed machine vise jaw along a first plane of movement and configured to clamp a work piece above the support, the attachment comprising an auxiliary vise having an auxiliary vise body, a fixed auxiliary vise jaw on the auxiliary vise body, and a moveable auxiliary vise jaw on the auxiliary vise body movable toward and away from the fixed auxiliary vise jaw along a second plane of movement and configured to clamp a work piece above the support, and an attachable bracket extending from the auxiliary vise body and securable to an outer surface the machine vise to support the auxiliary vise offset from the machine vise to which the attachment is attached, and wherein the attachable bracket extends laterally of the auxiliary vise and has an attachment section securable to the machine vise spaced from the auxiliary vise body, and has a support foot mounted on the auxiliary vise body separate from the attachable bracket, the support foot being securable to a support member supporting the machine vise to which the attachable bracket is attached.

2. The attachment of claim 1, wherein the attachment section is spaced from the auxiliary vise body to offset the auxiliary vise body laterally from the machine vise to which the attachment section is attached, and the attachable bracket supporting the auxiliary vise body on the machine vise in a position wherein the moveable auxiliary vise jaw moves in a second plane perpendicular to the first plane.

3. The attachment of claim 1, wherein the attachable bracket includes a mounting section for attachment to an exterior surface of the fixed machine vise jaw of the machine vise to which the attachable bracket is attached, the attachable bracket holding the auxiliary vise body positioned with the second plane perpendicular to the first plane when the mounting section is attached to the fixed machine vise jaw.

4. The attachment of claim 1, further comprising the moveable auxiliary vise jaw being driven by a jaw nut having a head, a nut body and a neck extending from the nut body to support the head, a longitudinal threaded opening in the nut body having an axis parallel to a direction of movement of the moveable auxiliary vise jaw, the nut body having a cylindrical outer surface around the longitudinal axis in portions other than where the neck extends from the nut body, and the auxiliary vise body having a cylindrical bore for slidably receiving the nut body with a longitudinal slot for slidably receiving the neck.

5. The attachment of claim 1, further comprising a jaw nut for driving the movable auxiliary vise jaw, the jaw nut having a longitudinal axis parallel to the direction of movement of the moveable auxiliary vise jaw, the jaw nut having a substantially cylindrical cross section perpendicular to the longitudinal axis, and a substantially cylindrical bore in the auxiliary vise body for slidably receiving the jaw nut.

6. The attachment of claim 2, further comprising the attachable bracket supporting the auxiliary vise upwardly from a supporting surface of the machine vise on which the attachable bracket is supported.

7. The attachment of claim 6, further comprising the auxiliary vise body being supported by the attachable bracket with the fixed and moveable auxiliary vise jaws on a side of the auxiliary vise body facing toward the machine vise to which the attachable bracket is attached.

8. A vise having a vise body configured to be secured to a support, a pair of jaws for clamping a work piece between the jaws and above a support surface of the support, and a bracket secured to the vise body, the bracket extending outwardly therefrom above the support surface, the bracket having a portion spaced from the vise body configured to secure the vise body to the support, with the vise body offset on the support in a lateral direction and a support foot mounted separate from the portion, the support foot extending downwardly below the vise body to support the vise body above the support foot.

9. The vise of claim 8 further comprising the portion of the bracket for securing the vise to a support defining a support plane parallel to a plane of movement of one of the jaws when the one jaw is moved to clamp a work piece.

10. The vise of claim 9, wherein the portion of the bracket for securing the vise comprise openings for fasteners spaced for standard vise plate mounting on vise jaws of machine vises.

11. The vise of claim 9, further comprising the bracket having a section that is offset to position the vise offset from the portion of the bracket for securing the vise to the support in a direction perpendicular to the lateral direction.

12. The vise of claim 9, further comprising the jaws of the vise facing in direction of the support to which the bracket is to be attached.

13. A vise for clamping a work piece comprising a vise body, a fixed jaw on the vise body, and a movable jaw mounted for movement on the vise body along an axis toward and away from the fixed jaw and having a recess opening to the vise body, a jaw nut mounted on the vise body for moving the movable jaw, the jaw nut having a nut body with a cylindrical surface around a major portion of an outer surface of the nut body, the jaw nut further having a portion inserted in the recess wherein a surface of the portion is configured to engage an inner surface of the movable jaw, and a bore in the vise body extending in direction along the axis and being cylindrical to mate with the cylindrical surface of the nut body and of size to slidably mount the jaw nut.

14. The vise of claim 13, further comprising the nut body having a neck extending from the nut body, the cylindrical surface of the nut body comprising all of the outer surface of the nut body except the neck, the head being positioned by the neck to extend into a recess in the moveable jaw to drivably engage the moveable jaw.

15. The vise of claim 14, wherein the vise body has a slot that opens to the bore for slidably receiving the neck.

16. The vise of claim 15, further comprising a drive on the vise body to drive the nut and moveable jaw in direction along the axis.

17. A dual vise combination for use with a machine tool having a tool table with a support surface defining a support plane, a machine vise having a machine vise body, a fixed machine vise jaw on the machine vise body and a movable machine vise jaw on the machine vise body movable and configured to clamp a work piece to be machined above the support surface, the fixed machine vise jaw being positioned at a first end of the machine vise body, the machine vise body being configured to be supported on the support surface of the tool table, an auxiliary vise including an auxiliary vise body, a fixed auxiliary vise jaw and a moveable auxiliary vise jaw on the auxiliary vise body moveable and configured to clamp a work piece to be machined above the support surface, an auxiliary vise support coupled to the machine vise and supporting the auxiliary vise laterally of the machine vise and with the fixed and moveable auxiliary vise jaws spaced from the support plane, and the auxiliary vise support comprising a bracket secured to an outer surface of the fixed machine vise jaw other than a surface of the fixed machine vise jaw facing the moveable machine vise jaw.

18. The dual vise combination of claim 17, wherein the auxiliary vise body is positioned to a side of a plane defined by a clamping surface of the fixed machine vise jaw opposite from the moveable machine vise jaw.

19. The dual vise combination of claim 18, wherein the moveable machine vise jaw is moveable in a first plane parallel to the support plane of the tool table supporting the machine vise, the auxiliary vise support supporting the auxiliary vise body in a position such that the moveable auxiliary vise jaw moves in a second plane perpendicular to the first plane.

20. The dual vise combination of claim 17, wherein the fixed auxiliary vise jaw and the moveable auxiliary vise jaw face each other to define a space opening in a direction away from the auxiliary vise body for receiving a work piece, the space facing in a direction toward a second end of the machine vise body.

21. The dual vise combination of claim 17, wherein a support foot is mounted on the auxiliary vise body, the support foot being securable to the tool table supporting the machine vise.

* * * * *